US011396025B2

(12) United States Patent
Clavaguera et al.

(10) Patent No.: US 11,396,025 B2
(45) Date of Patent: Jul. 26, 2022

(54) METHOD AND DEVICE FOR SORTING FIBERS IN SUSPENSION IN AN AEROSOL THROUGH THE COMBINATION OF ELECTROSTATIC AND CENTRIFUGAL FORCES

(71) Applicant: COMMISSARIAT A L'ENERGIE ATOMIQUE ET AUX ENERGIES ALTERNATIVES, Paris (FR)

(72) Inventors: Simon Clavaguera, Grenoble (FR); Michel Pourprix, Montlhery (FR); Francois Tardif, Lans en Vercors (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 86 days.

(21) Appl. No.: 16/753,976

(22) PCT Filed: Oct. 11, 2018

(86) PCT No.: PCT/EP2018/077804

§ 371 (c)(1),
(2) Date: Apr. 6, 2020

(87) PCT Pub. No.: WO2019/073009

PCT Pub. Date: Apr. 18, 2019

(65) Prior Publication Data

US 2020/0290058 A1 Sep. 17, 2020

(30) Foreign Application Priority Data

Oct. 12, 2017 (FR) ...................................... 1759588

(51) Int. Cl.
*B03C 3/06* (2006.01)
*B03C 3/15* (2006.01)
(Continued)

(52) U.S. Cl.
CPC .................. *B03C 3/06* (2013.01); *B03C 3/15* (2013.01); *B03C 3/155* (2013.01); *G01N 15/0656* (2013.01); *G01N 2015/0049* (2013.01)

(58) Field of Classification Search
CPC .. B03C 3/06; B03C 3/15; B03C 3/155; G01N 15/0656
See application file for complete search history.

(56) References Cited

U.S. PATENT DOCUMENTS 4,098,591 A * 7/1978 van Diepenbroek ..... B03C 3/06 95/57
5,117,190 A * 5/1992 Pourprix ............ G01N 15/0266 324/452
(Continued)

FOREIGN PATENT DOCUMENTS

JP 7-55689 B2 6/1995
KR 10-1179039 B1 9/2012
(Continued)

OTHER PUBLICATIONS

Hinds, "Aerosol Technology", Deposition, Second Edition, 1999, pp. 232-259.
Zebel et al., "A Sampling Method with Separated Deposition of Airborne Fibres and Other Particles", J. Aerosol Sci., 1977, vol. 8, pp. 205-213.
Chen et al., "Size Classification of Carbon Fiber Aerosols", Aerosol Science and Technology, 1993, vol. 19, No. 2, pp. 109-120, with cover page.
(Continued)

*Primary Examiner* — Patrick H Mackey
(74) *Attorney, Agent, or Firm* — Oblon, McClelland, Maier & Neustadt, L.L.P.

(57) ABSTRACT

The invention consists of a continuous sorting method and device which highlights the trajectory differences to which fibers of different form factors and particles charged under the joint influence of electrical forces and a centrifugal force could be subjected. Thus, according to the sorting method, the conditions exploit this difference in order to recover/collect the fibers separated from the non-fibrous particles
(Continued)

present in the same initial aerosol or to sort fibers exhibiting different form factors.

14 Claims, 5 Drawing Sheets

(51) Int. Cl.
*B03C 3/155* (2006.01)
*G01N 15/06* (2006.01)
*G01N 15/00* (2006.01)

(56) References Cited

U.S. PATENT DOCUMENTS

| | | | |
|---|---|---|---|
| 5,428,220 A * | 6/1995 | Ehara | B04B 5/08 250/281 |
| 5,736,024 A * | 4/1998 | Seo | B01D 15/00 204/554 |
| 6,012,343 A * | 1/2000 | Boulaud | G01N 15/0266 73/865.5 |
| 7,931,734 B2 | 4/2011 | Moosmueller et al. | |
| 9,239,279 B1 * | 1/2016 | Koizumi | G01N 27/624 |
| 10,300,410 B2 * | 5/2019 | Ji | B01D 21/262 |
| 10,675,639 B2 * | 6/2020 | Clavaguera | B03C 3/368 |
| 2003/0213366 A1 | 11/2003 | Totoki | |
| 2004/0050756 A1 | 3/2004 | Flagan | |
| 2020/0261923 A1 * | 8/2020 | Clavaguera | B03C 3/155 |

FOREIGN PATENT DOCUMENTS

| | | |
|---|---|---|
| KR | 10-1322689 B1 | 10/2013 |
| KR | 10-1558480 B1 | 10/2015 |
| WO | WO 96/06341 A2 | 2/1996 |
| WO | WO 2013/058429 A1 | 4/2013 |

OTHER PUBLICATIONS

Chen et al., "Design and Use of a Virtual Impactor and an Electrical Classifier for Generation of Test Fiber Aerosols with Narrow Size Distributions", J. Aerosol Sci., 1996, vol. 27, No. 1, pp. 83-94.
Han et al., "Airborne Fiber Separation by Electrophoresis and Dielectrophoresis: Theory and Design Considerations", Aerosol Science and Technology, 1994, vol. 21, No. 3, pp. 241-258, with cover page.
Griffiths, "The Selective Separation of Aerosol Particles of Different Shape", J. Aerosol Sci., 1987, vol. 18, No. 6, pp. 761-763.
Griffiths, "The Shape Selective Sampling of Fibrous Aerosols", J. Aerosol Sci., 1988, vol. 19, No. 6, pp. 703-713.
Baron et al., "Length Separation of Fibers", Aerosol Science and Technology, 1994, vol. 21, No. 2, pp. 179-192, with cover page.
Lilienfeld, "Rotational Electrodynamics of Airborne Fibers", J. Aerosol Sci., 1985, vol. 16, No. 4, pp. 315-322.
Deye et al., "Performance Evaluation of a Fiber Length Classifier", Aerosol Science and Technology, 1999, vol. 30, No. 5, pp. 420-437, with cover page.
Dubey et al., "Numerical Investigation of Sheath and Aerosol Flows in the Flow Combination Section of a Baron Fiber Classifier", Aerosol Science and Technology, 2014, vol. 48, No. 8, pp. 896-905, with cover page.
Ehara et al., "Novel Method to Classify Aerosol Particles According to their Mass-To-Charge Ratio-Aerosol Particle Mass Analyser", J. Aerosol Sci., 1996, vol. 27, No. 2, pp. 217-234.
Olfert et al., "New method for particle mass classification—the Couette centrifugal particle mass analyzer", Journal of Aerosol Science, 2005, vol. 36, pp. 1338-1352.
International Search Report dated Jan. 11, 2019 in PCT/EP2018/077804 filed on Oct. 11, 2018, 3 pages.
French Preliminary Search Report dated Jul. 6, 2018 in French Application 1759588 filed on Oct. 12, 2017, 2 pages.

* cited by examiner

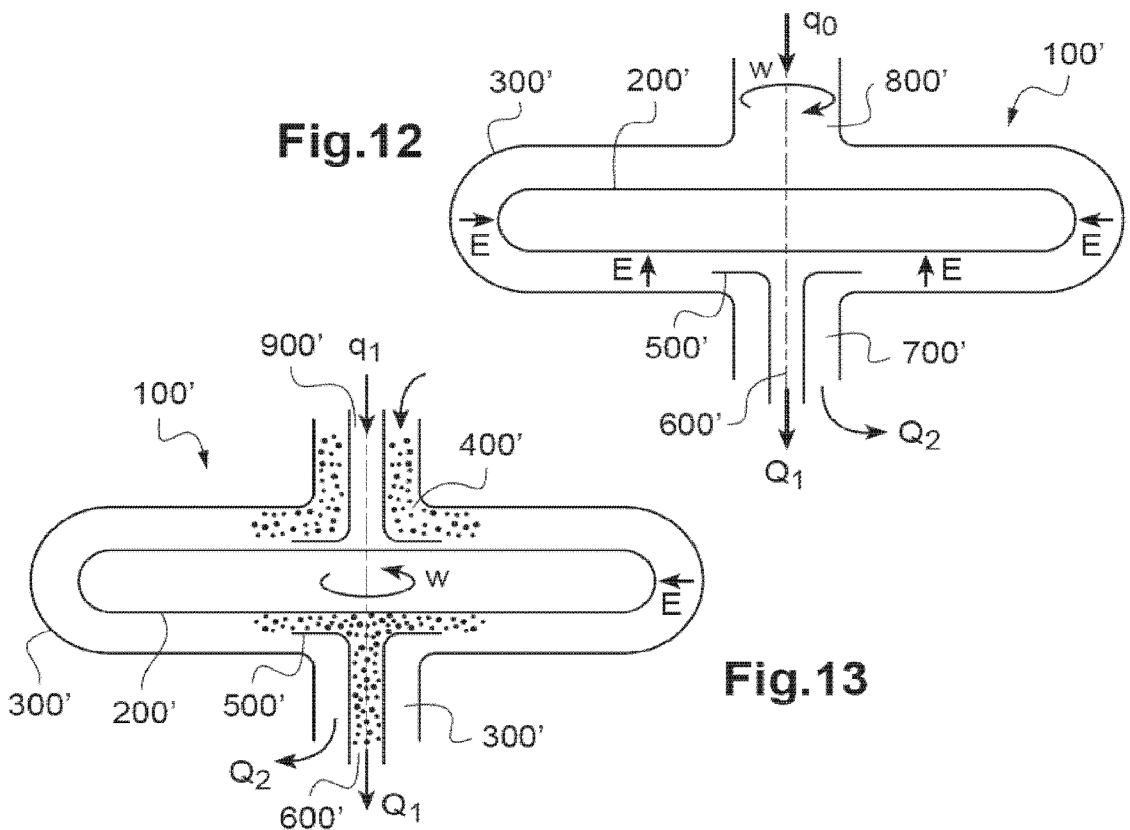
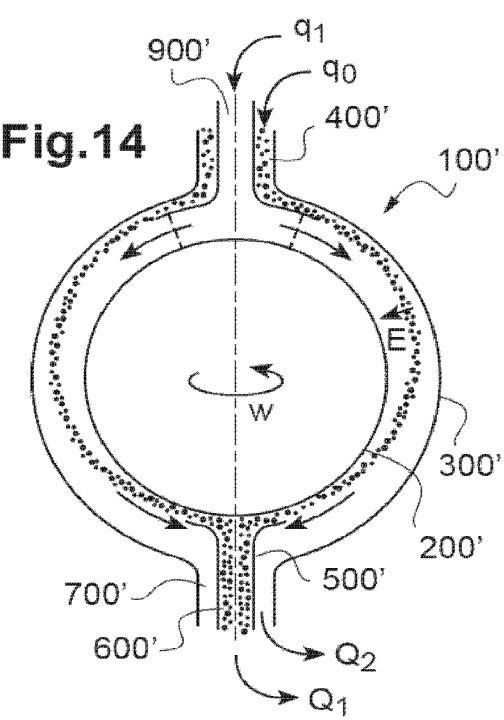

METHOD AND DEVICE FOR SORTING FIBERS IN SUSPENSION IN AN AEROSOL THROUGH THE COMBINATION OF ELECTROSTATIC AND CENTRIFUGAL FORCES

TECHNICAL FIELD

The present invention relates to the field of the sorting of micro- and nano-fibers in an aerosol likely to contain the fibers of different sizes and possibly non-fibrous particles.

It relates more particularly to the production of electrodynamic devices for implementing such a sorting.

The present invention aims to increase the selectivity of the analyzers and of the devices for sorting fibrous particles of mineral origin (ceramics, glass, carbon nanotubes, metal nanowires, etc.), of organic origin or of biological origin (cells, bacteria, viruses, etc.), in real time.

It also aims to augment the performance levels of the existing methods for continually detecting and measuring, in real time, concentrations of asbestos fibers implemented notably in very dusty environments.

It also aims to improve the performance levels of the conventional methods of filter collection followed by post-analysis by microscopy.

One of the applications targeted by the invention is the sorting of asbestos fibers in an aerosol likely to contain any particles, any non-fibrous particles.

"Asbestos fibers" are defined and characterized by the World Health Organization as follows:
"WHO" asbestos fibers characterized by L≥5 μm, 0.2<d<3 μm, L/d ratio ≥3,
short asbestos fibers (SAF) with 0.5<L<5 μm, d<3 μm, L/d≥3,
fine asbestos fibers (FAF) with L≥5 μm, d<0.2 μm and L/d≥3,
where L and d respectively represent the length and the diameter.

Although described preferentially with reference to the application of selection of asbestos fibers, the invention applies to the sorting of any type of fibrous particles and for various applications.

State of the Art

The regulations concerning the modalities for measuring the level of dust, notably of asbestos fibers, is clear, strict and increasingly restrictive. For example in France, the regulation has recently lowered the occupational exposure limit value (OELV) to 10 fibers per liter of air inhaled over eight working hours.

Measuring the concentration in terms of number of fibers in the air has hitherto been done by sampling on a membrane or by means of direct reading devices.

Whatever the sampling mode, a major problem is always encountered in the case of very dusty environments. This relates to the difficulty in exclusively counting the fibers because, particles of all kinds and origins (oil, cement, paints, etc.) are also present and can disturb or mask the measurements.

Indeed, in particular the cleansing and asbestos removal operations during demolition or renovation processes (buildings, rolling stock, etc.) implement surfaces on which multiple materials have been deposited over very long periods. It is therefore particularly difficult to discriminate a small number of fibers in an environment very strongly charged with particles.

Given the low number of fibers to be counted, a certain number of devices described in the literature are no longer relevant today, in particular because of their detection limitations.

In aerosol physics, it is known that, in the absence of electrical field in a unipolar ionized space, the aerosol particles in suspension in this space will acquire an electrical charge through the mechanism of electrical charge by diffusion of unipolar ions on their surface.

A state of balance will then be established, the charge acquired by the particles depending notably on the product Ni*t, where Ni represents the ion concentration and t the dwell time of the particles in the ionized space.

Ultimately, for a given product Ni*t, the result thereof is that the electrical mobility acquired by these particles, in a mode of charge solely by ion diffusion, is all the greater when the articles are finer. This is illustrated notably by FIG. 15.4 on page 330 of publication [1].

By contrast, it has been widely proven that the result is the reverse for particles in the form of fibers charged only by unipolar ion diffusion. Thus, the publication [2] shows that, for fibers of given diameter, the longer the fibers, the greater their electrical mobility.

This property is exploited to classify carbonized fibrous aerosols: study [3]. This study was added to a few years later by the same team by describing therein carbon fibers and glass fibers: see publication [4]. In particular, they were interested in the electrical mobility of carbon fibers of a diameter equal to 3.74 μm, as a function of their length, for a product Ni*t equal to $1.9*10^7$ s/cm$^3$.

The authors of the publication [5] have also demonstrated the abovementioned reverse result for fibers by calculation. More specifically, to arrive at this result, these authors calculated the electrical mobility of fibrous particles of a diameter equal to 1 μm for different fiber lengths equal respectively to 3 μm, 10 μm and 20 μm, charged only by unipolar ion diffusion. They also demonstrate that, with constant fiber diameter, the electrical mobility of the fibers is all the higher when their length is greater.

Furthermore, the authors of this publication [5] show that it is possible to make practical use of this particular feature to separate the fibers from the other particles in suspension in an aerosol. To do this, they recommend the serial use of two separators, namely a first aerodynamic separator to perform a selection according to the size of the particles by centrifugation, sedimentation or inertia, and, downstream of the first separator, a second separator, but of electrostatic nature, for selecting the fibers according to their length.

Earlier works highlight the same physical principle and describe the separation and the deposition of fibrous particles on a porous substrate: see publications [6] and [7] by the same author.

Other works which implement a physical principle distinct from those described previously, have addressed the same issue of separation of fibrous particles. In these other works, the particles are neutralized electrically by a radio-active source and only bear polarization in an electrical field (dielectrophoresis) making it possible to classify them according to their length. The family of these devices bears the name of "Baron fiber classifier" in referring to the works of the team of the researcher P. A. Baron: see publication [8].

In a Baron fiber classifier, the conductivity of the fibers is a prerequisite to allow for an effective sorting. Nevertheless, it would seem that, for significant moisture levels, typically higher than 30%, the water condensed on the surface of the fibers produces a conductive layer which would make it possible to mitigate the problems of non-conductive fibers: see publication [9].

An evaluation of this kind of device was carried out by the same team of the researcher Baron, by simulation in computational fluid dynamics (CFD): see publication [10]. It emerges from this assessment that this type of device is limited to the short fibers.

Finally, a recent enhancement to this type of device was proposed to generate large quantities of sorted fibers for toxicology studies: see publication [11].

The patent U.S. Pat. No. 7,931,734B2 discloses a system comprising two differential electrical mobility analyzers (DMA) in series, which makes it possible, according to the inventors, to separate fibers and particles according to their charges. As a reminder, a DMA is an instrument capable of separating particles according to their electrical mobility by selecting, for a given voltage, a given electrical mobility class.

The patent application WO 2013/058429A1 and patents KR 101558480B1 and KR101322689B1 disclose fiber separation devices in the general toroidal form, which implement the process of charging aerosols by unipolar ion diffusion. In these documents, it is mentioned that the electrical effects become predominant in the toroidal geometry described because the rate of flow decreases with distance away from the axis of the device whereas the rate of drift due to the electrical field remains constant.

In the general field of electrically charged particles, works have been conducted on the use of other forces in addition to an electrical field, for the driving and the separation of the particles.

First of all, the field of gravity was exploited in addition to an electrical field.

Thus, the patent U.S. Pat No. 6,012,343B discloses a DMA analyzer of radial flow type which serializes two so-called circular electrical mobility selectors and in which the extraction of the particles from the upstream selector to the downstream selector is performed by a slit by exploiting both the electrical and gravity fields.

The combined use of a centrifugal force and of an electrical field has also been implemented.

The first instrument relating to this combined centrifugal force/electrical field use is disclosed in the patent JP07055689, the results of which are given in the publication [12].

In this instrument, the electrically charged particles circulate by laminar flow between two concentric cylinders revolving at the same velocity. To ensure that the particles do indeed revolve at the same velocity as the cylinders, which is essential for optimal operation, the longitudinal air flow is channeled by insulating spacer guides positioned between the two cylinders. Another function of these spacers is to keep the cylinders mutually mechanically coaxial. An electrical field is established between the cylinders, such that the particles are subjected on the one hand to a centrifugal force proportional to their mass, and on the other hand to a centripetal force proportional to their electrical charge. The particles which leave the cylinders thus have the same combined mass and charge characteristic. By measuring a charge of a particle, it is therefore possible to deduce its weight therefrom.

This type of instrument is marketed by the company KANOMAX under the name "Model 3602 APM-IT".

An enhancement has been made to this analysis instrument: see publication [13]. The enhancement consists in revolving the inner cylinder slightly faster than the outer cylinder to better radially balance the electrical and centrifugal forces.

The apparatus marketed by the company CAMBUSTION under the name "Model Centrifugal Particle Mass Analyser" implements this enhancement.

In fact, from studying the state of the art, it emerges that no device has been proposed that makes it possible to effectively and simply separate fibers from one another or from non-fibrous particles contained in an aerosol.

Now, there is a need for such a device in order to continually sort fibrous particles from one another and from non-fibrous particles (by minimizing the depositions of particles of interest on the walls) in the context of industrial methods or to increase the selectivity of existing real-time fiber analyzers, notably by reducing the part of detection linked to the non-fibrous particles likely to mask the counting of the fibers.

The general aim of the invention is then to at least partly address this need.

SUMMARY OF THE INVENTION

To do this, the subject of the invention is first of all a method for sorting, preferably continuously, micro- and nano-fibers in suspension in an aerosol likely to contain fibers of different sizes and possibly non-fibrous particles, comprising the following steps:

a/charging of the particles in suspension in the aerosol, by unipolar ion diffusion;

b/application of a uniform electrical field between two electrically conductive surfaces of revolution, arranged with their axis vertical and defining a space between them; the uniform electrical field being directed from the outer surface to the inner surface;

c/introduction of an aerosol flow from an input on top between the two surfaces of revolution; the flow of the air flow being non-turbulent in the space between surfaces of revolution; the air flow circulating from an input on top between the two surfaces of revolution to an output below, delimited by a tube arranged below between the two surfaces of revolution;

c'/simultaneously with the step c/, rotation at a given velocity of the surfaces of revolution and of the output tube; and d/recovery of the part of air flow charged with fibers and circulating inside the output tube; the fibers recovered in the part of air flow being separated from the non-fibrous particles initially present in the aerosol and ejected by the centrifugal force out of the output tube.

In the case of sufficiently heavy fibers, such as the WHO asbestos fibers, the inventors think that the implementation of the method according to the patent application Ser. No. 16/753,993 entitled “Method and device for sorting fibers in suspension in an aerosol by the combination of electrostatic and gravitational forces” and filed on the same day as the present application, is sufficient, as has been shown by the analytical calculations, detailed hereinbelow.

On the other hand, in the other cases, the inventors thought that the gravity forces could prove too weak to ensure an effective selection of fibers of different form factors, such as SAF and FAF asbestos fibers.

Thus, they thought to submit the particles no longer to the force of gravity but to a centrifugal force, while subjecting them once again to an antagonistic electrical force.

In terms of orders of magnitude, a particle of mass M revolving at an angular velocity w equal to 420 revolutions/ min over a radius R equal to 5 cm, is subject to a centrifugal force FC equal to $M*\omega^2*R$, with $\omega$ in radian/s, R in meters, M in kg, FC in Newtons. In other words, with the above-mentioned numeric data, a force FC equal to $M \times 96.8$ m/s$^2$.

By comparison, the force of gravity which is exerted on this particle will be P equal to $M*g$, in which $g=9.8$ m/s$^2$.

It can therefore be seen that, in this case, the centrifugal force is equivalent to approximately 10 times the force of gravity. Since this force varies with the square of the angular velocity, a velocity w of 1400 rpm for example will lead to a centrifugal force of approximately 100 times the force of gravity. This therefore offers an interesting opportunity for separating fibers of low mass relative to non-fibrous particles.

According to one advantageous embodiment, the method further comprises a step d'/simultaneous with the step d/, whereby the part of air flow charged with non-fibrous particles and circulating inside the output tube is recovered.

According to a variant, with surfaces of revolution and the output tube which are cylinders, a method whereby:
the step c/is performed by introduction of the aerosol into an input slit arranged in the space between cylinders and by circulation of an axial flow of filtered air introduced on either side of the slit co-current with the aerosol flow;
the step d/is performed by recovery of the part of air flow charged with fibers inside the output tube; and
- if necessary, the step d'/is performed by recovery of the part of the air flow charged with non-fibrous particles inside the output tube.

According to another variant, with the surfaces of revolution which are openwork disks with concave circular edge, arranged horizontally, defining a space between them; the input being a duct produced in the axial extension of the outer disk on top thereof; the output tube being composed of a first portion separating the space between disks into two, prolonged by a cylindrical portion along the axis of revolution:

- the step c/is performed by introduction of the aerosol into the input duct;
- the step d/is performed by recovery of the part of the air flow charged with fibers inside the output tube; and
- if necessary, the step d'/is performed by recovery of the part of the air flow charged with non-fibrous particles inside the output tube.

Another subject of the invention is a device for implementing the sorting method described above, comprising:

- two electrically conductive surfaces of revolution, arranged with their axis vertical and defining a space between them;
- means for applying a uniform electrical field between the two surfaces, the field being directed from the outer surface to the inner surface;
- means for introducing an aerosol flow of fibers in suspension in an aerosol likely to contain non-fibrous particles, from an input on top between the two surfaces of revolution;
- means for rotating at a given velocity the two surfaces of revolution and an output tube arranged below between the two surfaces of revolution; and
- means for recovering the part of air flow charged with fibers, inside the output tube.

According to an advantageous embodiment, the device further comprises means for recovering the part of the air flow charged with non-fibrous particles inside the output tube.

According to a variant, the two surfaces of revolution are coaxial cylinders, the input being a slit arranged in the space between cylinders, and the output tube being a cylinder.

According to another variant, the two surfaces of revolution are two disks with concave circular edge, arranged horizontally coaxially to one another defining a space between them; the input being a duct produced in the axial extension of the outer disk on top thereof; and the output tube being composed of a first portion separating the space between disks into two, prolonged by a cylindrical portion along the axis of revolution.

A final subject of the invention is the use of a method described above and/or of a device described previously for the detection and measurement of concentration in terms of number of fibers, in particular of asbestos fibers, in air, notably in a dusty environment.

The method and the device according to the invention are particularly suited to the detection and measurement of concentrations of short asbestos fibers (SAF) and/or of fine asbestos fibers (FAF). However, the method and the device according to the invention can be used for the detection and measurement of concentrations of WHO asbestos fibers.

It is possible to use the method and/or perform the integration of the device according to the invention upstream of a real time system for measuring concentrations of asbestos fibers in air, notably to continually measure the concentrations and their variations over time.

DETAILED DESCRIPTION

Other advantages and features will become more apparent on reading the detailed description, given in an illustrative and nonlimiting manner, with reference to the following figures in which:

FIG. 1 is a schematic view in longitudinal cross section of a fiber sorting device with flat plates according to the patent application Ser. No. 16/753,993 entitled "Method and device for sorting fibers in suspension in an aerosol by the combination of electrostatic and gravitational forces" filed on the same day as the present application;

FIG. 2 is a repeat of FIG. 1 indicating the dimension and velocity parameters involved in calculating trajectories of particles circulating between the flat plates;

FIG. 3 schematically represents, as a function of different slenderness values (length/diameter ratio), the different trajectories followed by the fibers circulating in the device of FIG. 1;

FIG. 4 represents a summary, as a function of different slenderness values, of the different trajectories followed both by the fibers and the non-fibrous particles of equivalent volume contained in one and the same aerosol, circulating in the device of FIG. 1;

FIG. 5 is a schematic view in longitudinal cross section of a first variant of a device according to FIG. 1;

FIG. 6 is a schematic view in longitudinal cross section of a second variant of a device according to FIG. 1;

FIG. 7 is a schematic view in longitudinal cross section of a third variant of a device according to FIG. 1;

FIG. 8 is a schematic view in longitudinal cross section of a fourth variant of a device according to FIG. 1;

FIG. 9 is a schematic view in longitudinal cross section of a fifth variant of a device according to FIG. 1;

FIG. 10 is a schematic view in longitudinal cross section of a sixth variant of a device according to FIG. 1;

FIG. 11 is a schematic view in longitudinal cross section of a fiber sorting device with flat plates according to the invention;

FIG. 11A is a schematic view in transverse cross section of the device according to FIG. 11;

FIG. 12 is a schematic view in longitudinal cross section of a variant of a device according to the invention;

FIG. 13 is an advantageous variant of the device according to FIG. 12;

FIG. 14 is a schematic view in longitudinal cross section of a fiber sorting device with spherical geometry according to the invention; and FIG. 15 is a schematic view in longitudinal cross section of a fiber sorting device with cylindrical geometry according to the invention.

Throughout the present application, the terms "vertical", "bottom", "top", "low", "high", "below", "above", and "height" should be understood with reference to a separation device according to the invention arranged horizontally or vertically.

Likewise, the terms "input", "output", "upstream" and "downstream" should be understood with reference to the direction of the flow of aerosol in a device according to the invention. Thus, the input designates a zone of the device through which the aerosol containing the fibers and the non-fibrous particles is introduced whereas that of output designates that through which the air flow charged only with fibers is discharged.

For clarity, the same elements of the sorting devices according to the examples illustrated of the two alternatives are designated by the same numeric references.

Figure 1:
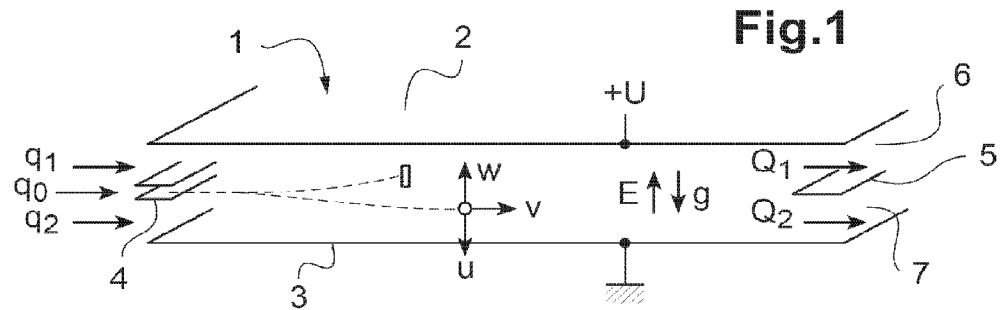
Figure 2:
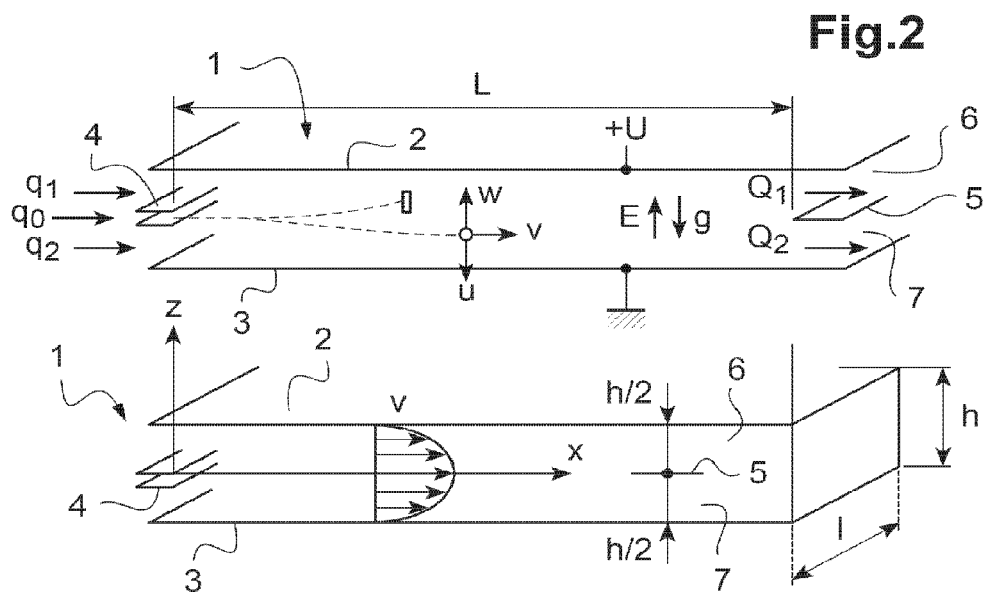

FIG. 1 shows an example of device 1 for sorting fibers and non-fibrous particles contained initially in an aerosol. This device 1 is in accordance with the patent application entitled "Method and device for separating, with the use of gravity, fibers in suspension in an aerosol likely to contain non-fibrous particles" filed on the same day as the present application.

It is specified that previously, before the introduction of the aerosol into the device 1, the particles of the aerosol are charged negatively by unipolar ion diffusion.

The sorting device 1 first of all comprises two parallel flat plates 2, 3, arranged horizontally. These plates 2, 3 are electrically conductive.

At a longitudinal end of the plates 2, 3, there is arranged an input slit 4, in the middle of the space between plates, that is to say the middle of the slit 4 is at half the height h of the space between plates 2, 3. The slit 4 can for example be produced by two plates, also flat and mutually parallel, but over a height much lesser than the space between plates 2, 3.

At the other longitudinal end, there is arranged a separation wall 5, also at the middle of the space between plates 2, 3. This wall 5 therefore delimits, with the plate on top 2, a channel 6, while it delimits, with the plate below 3, a channel 7.

An electrical field E is generated, preferably uniform and preferably of constant intensity, between the plates 2, 3, the field E being directed from bottom to top. For this, for example, the bottom plate 3 is brought to the zero potential, whereas the top plate 2 is at the potential +U. In the context of the invention, it is perfectly possible to envisage the reverse, that is to say particles positively charged with an electrical field in the device equal to −U.

A longitudinal flow of filtered air with non-turbulent flow is introduced from the side of the slit 4, into the space between plates 2, 3. The filtered air flow is separated into a flow q1 between the slit 4 and the plate on top 2 and a flow q2 between the slit 4 and the plate below 3.

The aerosol is then introduced through the slit 4, at a flow rate $q_0$.

Thus, in its travel between the plates, any particle, including a fibrous one, will be subjected to these two antagonistic force fields, field of gravity g and electrical field E.

Each particle, fibrous or not, will therefore be subjected to two opposing transverse velocities:

an upward velocity due to the electrical field denoted w, such that w=Z*E, where Z is the electrical mobility of the particle, and a downward velocity due to the field of gravity denoted u, such that u=τ*g, where T is the relaxation time of the particle, and g is the Earth's field of gravity.

The trajectory of a particle will therefore result from the composition of these two transverse velocities u and w on the one hand, of its longitudinal velocity v in the non-turbulent flow on the other hand.

For a fixed geometry and flow rate, an appropriate value of the field E can therefore direct the fibers and the fine particles that are highly electrically mobile and not subject to gravity, into the top part of the space between plates 2, 3, and direct the non-fibrous particles into the bottom part 7 of this space, above all the large particles, which have little electrical mobility and are subject to gravity.

It is therefore possible to recover, in the output channel 6, the fibers separated and borne by the air flow at the flow rate Q1.

In parallel, it is possible to recover, in the output channel 7, the fibers exhibiting the lowest form factor or the non-fibrous particles borne by the air flow at the flow rate Q2.

The sum of the input flow rates $q_0$, $q_1$ and $q_2$ equals the sum of the output flow rates $Q_1$ and $Q_2$.

Thus separated from the fibers, the large particles can no longer mask the count of the fibers for the asbestos fiber measuring application.

The inventors have corroborated, by calculations presented hereinbelow, the separation between fibers and non-fibrous particles by the combined action of electrical force resulting from a field E created between flat plates, and the Earth's field of gravity g.

In the calculations, the case of carbon fibers is considered, specifically those which were used in the experiments mentioned in the publication [3], of 3.74 μm diameter, charged by unipolar ion diffusion with a product Ni*t=1.9.10$^7$ s/cm$^3$. The advantage of using carbon fibers is that their electrical characteristics have been particularly well studied by the authors of the publication. Another advantage is also deliberately choosing conditions conducive to revealing the action of the field of gravity relative to the action of the electrical field.

The trajectory of a particle is obtained by composing the velocities u, v, w, in which:

$$u=\tau*g$$

$$w=Z*E,$$

i.e.

$$w - u = \frac{dz}{dt} = Z \cdot E - \tau \cdot g \quad (1)$$

$$v = \frac{dx}{dt} = \frac{3}{2} * \frac{Q}{l*h} * \left(1 - 4*\frac{z^2}{h^2}\right) \quad (2)$$

in which
τ represents the relaxation time of a particle, in seconds (s)
g is the acceleration of gravity, in m/s²;
Z is the electrical mobility of the particle, in m²/(V*s);
E is the electrical field in V/m;
Q is the air flow rate driving the particle in m³/s;
is the width of the air flow circulation channel; and
h is the air flow circulation height.

By eliminating dt, in the equations (1) and (2), the following is obtained:

$$\frac{3}{2} * \frac{Q}{l*h} * \left(1 - 4 * \frac{z^2}{h^2}\right) * dz = (Z*E - \tau*g)*dx$$

In other words by performing the integration $$\frac{3}{2} * \frac{Q}{l*h} * \int_0^z \left(1 - 4 * \frac{z^2}{h^2}\right) * dz = \int_0^x (Z*E - \tau*g)\tau * dx$$

Hence the final equation (3) as follows:

$$\frac{3}{2} * \frac{Q}{l*h} * \left(z - \frac{4}{3} * \frac{z^3}{h^2}\right) = (Z*E - \tau*g)*x$$

To calculate the relaxation time $\tau_f$ of a fiber, the equation (4) is used:

$$\tau_f = \frac{\rho * d'^2}{18 * \eta * \chi_f}$$

in which:
ρ represents the density equal to $1.832 \cdot 10^3$ kg/m³ for carbon fibers;
$d' = d*(1.5*\beta)^{1/3}$ and d is equal to 3.74 μm;
η represents the viscosity of air equal to $1.81*10^{-5}$ Pa·s;
$\chi_f$ is the form factor dependent on β; and
β is the slenderness (ratio between fiber length and diameter).

By taking into account the experimental data from the publication [3] and according to the equation (4), the table 1 below of fiber characteristics is obtained:

| β | $\chi_f$ | $Z_f$ in m²/(V*s) | $\tau_f$ in s |
|---|---|---|---|
| 10 | 1.269 | 7.97*10⁻⁸ | 3.77*10⁻⁴ |
| 20 | 1.541 | 11.27*10⁻⁸ | 4.93*10⁻⁴ |

It is specified that the experimental data used are valid for $N_i*t$ equal to $1.9*10^{13}$ ions*s/m³, where $N_i$ is the concentration of unipolar ions and t is the dwell time.

To calculate the electrical field E which allows fibers of factor β equal to 20, to arrive at the top of the space between plates, i.e. closest to the top plate, with x=L, the equation (3) for $$z = \frac{h}{2},$$

which gives:

$$E = \frac{\frac{Q}{2*l*L} + \tau_f * g}{Z_f}$$

with Q representing the flow rate equal to 2 liters per min; l=5 cm, L=20 cm,
$\tau_f = 4.93*10^{-4}$ s, $Z_f = 11.27*10^{-8}$ m²/(V*s) and g=9.81 m/s², an electrical field value E equal to $5.76*10^4$ V/m is obtained.

By using this value in the equation (3) above, all the elements are there to find the trajectory of the fibers of factor β equal to 20.

For the same value E, it is also possible to find all the elements to find the trajectory of the fibers of factor β equal to 10.

It is possible to proceed and do the same calculations for a volume-equivalent sphere (the indices "se" hereinbelow corresponding to an equivalent sphere).

Let $d_{se}$ be the volume diameter of a sphere equivalent to a fiber of diameter d and of length $l_f$, then the following relationship applies:

$$\frac{\pi * d^2}{4} * lf = \frac{4}{3} * \pi * \left(\frac{dse}{2}\right)^3$$

Then, with β which is the ratio between fiber length lf and diameter d, the equation (4) applies:

$$d_{se} = d*(1.5*\beta)^{1/3}.$$

For the calculation of the relationship time of the sphere, the equation (5) is used:

$$\tau_{se} = \frac{\rho * d_{se}^2}{18 * \eta * \chi_{se}}$$

with $\chi_{se}$ equal to 1.

For the calculation of electrical mobility of the spheres, the publication [1] makes it possible to determine it for a product $N_i*t$ equal to $10^{13}$ ions*s/m³.

It is possible to extrapolate to assume conditions calculated for the fibers, i.e. with $N_i*t$ equal to $1.9*10^{13}$ ions*s/m³.

To do this, the expression (15.24) on page 325 of the publication [1] is used, which makes it possible to find a multiplying coefficient equal to 1.083.

The table 2 below of characteristics of the equivalent spheres is therefore obtained:

| β | $d_{se}$ in μm | $\chi_{se}$ | $Z_{se}$ m²/(V*s) | $\tau_{se}$ in s |
|---|---|---|---|---|
| 10 | 9.24 | 1 | 4.52*10⁻⁸ | 4.78*10⁻⁴ |
| 20 | 11.63 | 1 | 4.48*10⁻⁸ | 7.59*10⁻⁴ |

Figure 3:
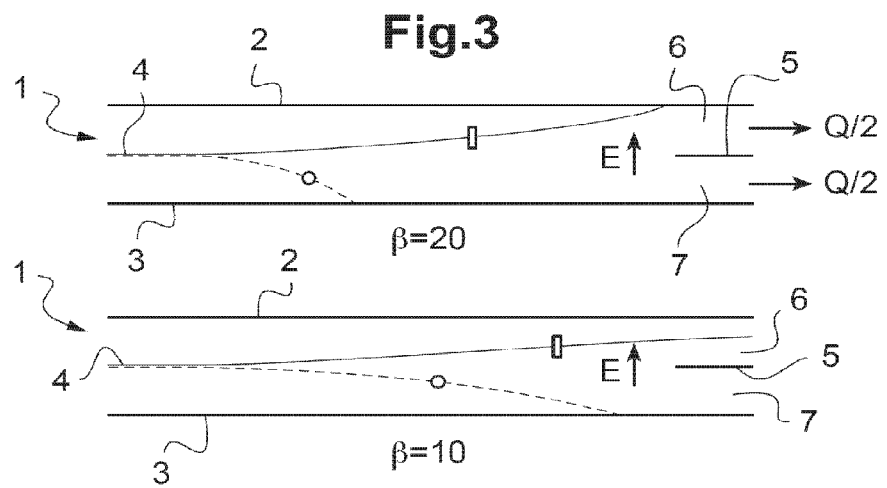

The trajectory of these two types of particles, i.e. fibers and equivalent spheres, is illustrated in FIG. 3 respectively for β=20 and β=10.

It emerges from this FIG. 3 that the separation between this type of fiber and their equivalent spherical particles, in terms of volume and of mass, is therefore clearly established.

Figure 4:
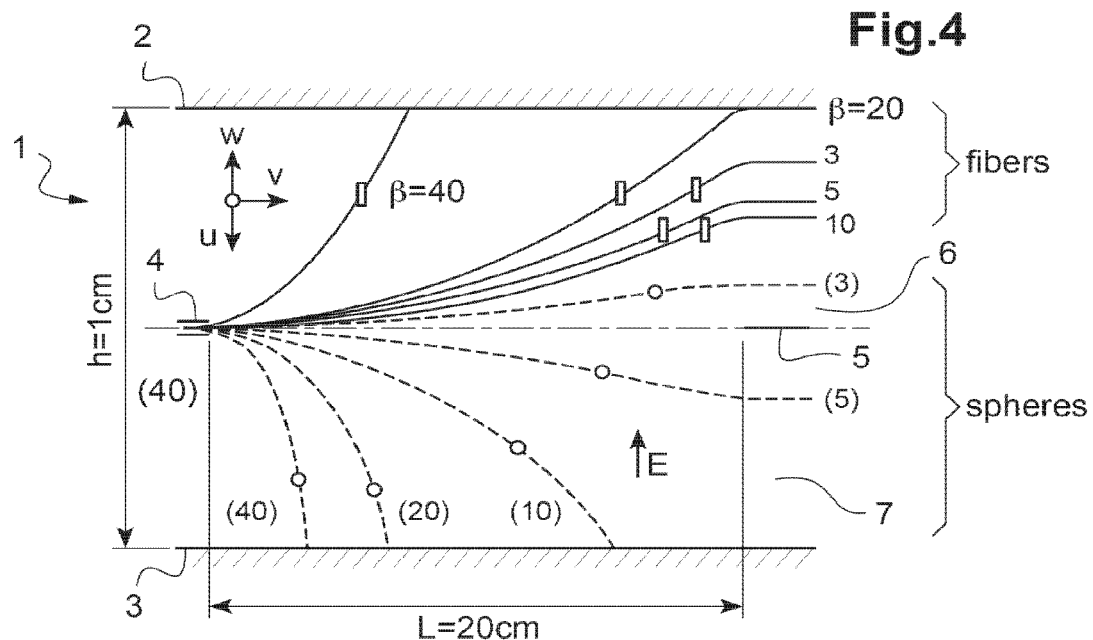

FIG. 4 illustrates the trajectories for the values of β respectively equal to 3, 5, 10, 20 and 40.

Figure 5:
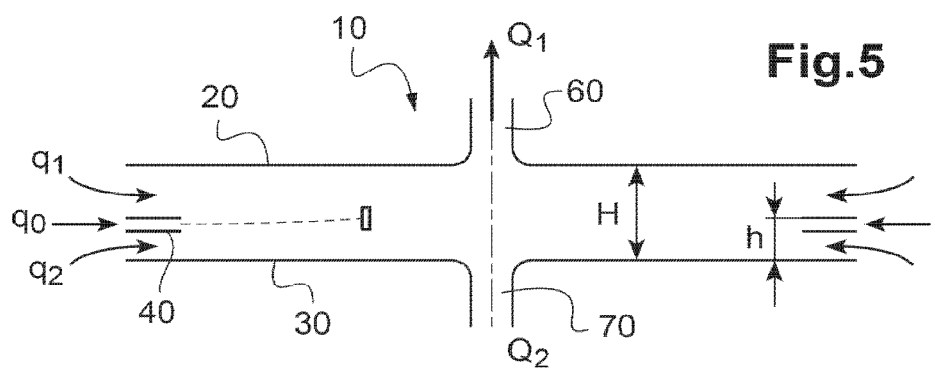
Figure 6:
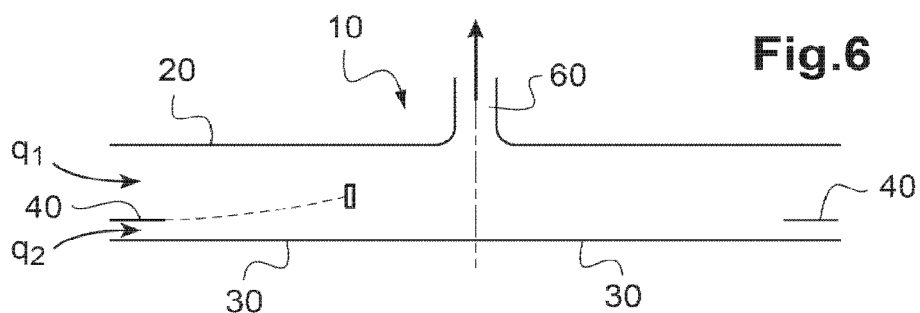

FIGS. 5 and 6 show variants of device 10 in which the rectangular flat plates are replaced by circular solid plates 20, 30 between which the aerosol and the filtered air are injected and circulate co-current according to a radial flow from the outside toward the center of the plates 20, 30.

In the variant of FIG. 5, the input is a circular slit 40 arranged in the space between plates 20, 30. The output through which the fibers are recovered is a duct 60 produced in the axial extension in the circular plate 20 on top. The non-fibrous particles that fall through gravity are, for their part, discharged through a duct 70 produced in the axial extension in the circular plate 30 below.

In the variant of FIG. 6, the input slit 40 is delimited by the circular plate below 30 and there is only a recovery of the fibers through the axial duct 60 on the plate on top 20.

It is possible to envisage arranging devices according to the variants of FIGS. 5 and 6 upstream of direct reading devices, the large, non-fibrous particles being eliminated.

Figure 7:
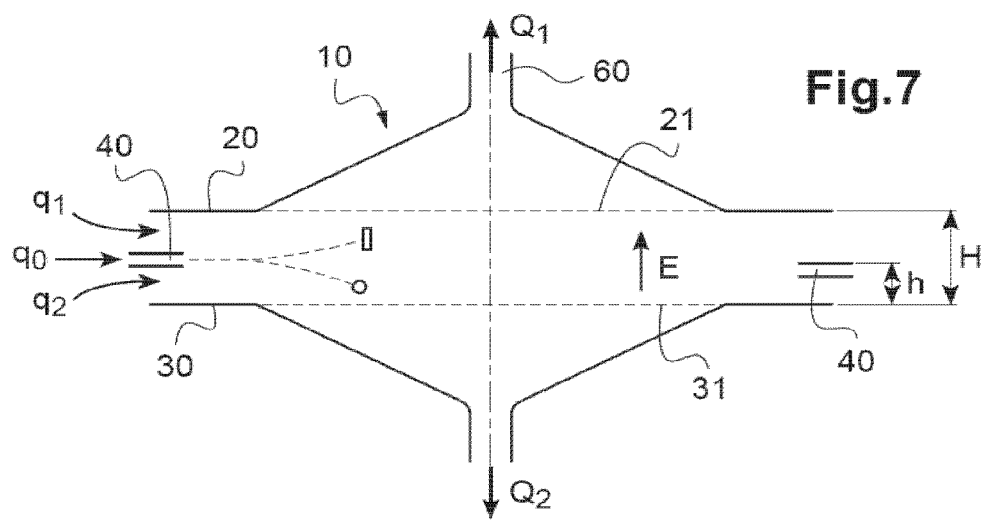
Figure 8:
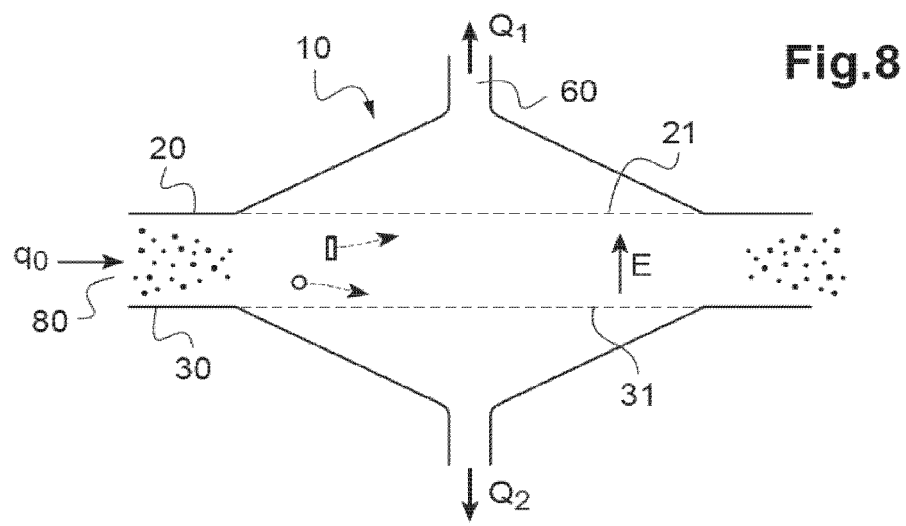
Figure 9:
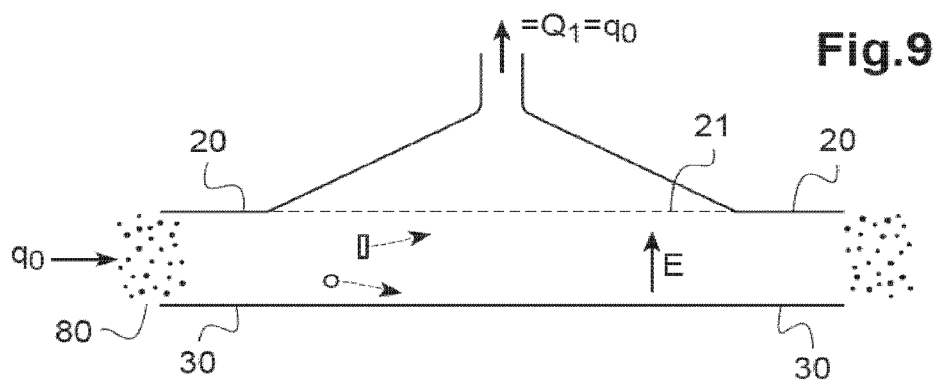

FIGS. 7 to 9 show variants, in which the aerosol and the filtered air are injected and made to circulate, also circulating co-current according to a radial flow from outside toward the center but, instead of recovering the separated fibers in a duct 60 and if necessary the non-fibrous particles in a duct 70 as in FIGS. 5 and 6, the separated particles are collected on one or two filtering membranes 21, 31 which are electrically conductive (or insulating, but supported by conductive gratings).

In the variant of FIG. 7, a filtering membrane 21 is arranged as collection surface on top and a filtering membrane 31 is arranged as collection surface below. The electrical field E is applied between the two filtering membranes 21, 31 from bottom to top. The aerosol is injected radially into a circular slit 40 arranged in the space between membranes 21, 31. The separated fibers are collected on the membrane on top 21, the air transporting them being discharged through an output duct 60 produced in the axial extension above the filtering membrane 21. The non-fibrous particles that fall through gravity are collected on the membrane below 31, the air transporting them being discharged through an output duct 70 produced in the axial extension below the filtering membrane 31. As illustrated, the ducts 60, 70 are produced at the end of a solid truncated cone respectively above the top filtering membrane 21 and below the lower one 31.

The device of FIG. 8 is similar to that of FIG. 7, except that the aerosol is injected radially over all the height of the space 80 between the membranes 21, 31.

The device of FIG. 9 comprises a single filtering membrane 21 for the collection of the separated fibers with radial injection over all the height of the space 80 between the membrane 21 and the solid disk 30.

Figure 10:
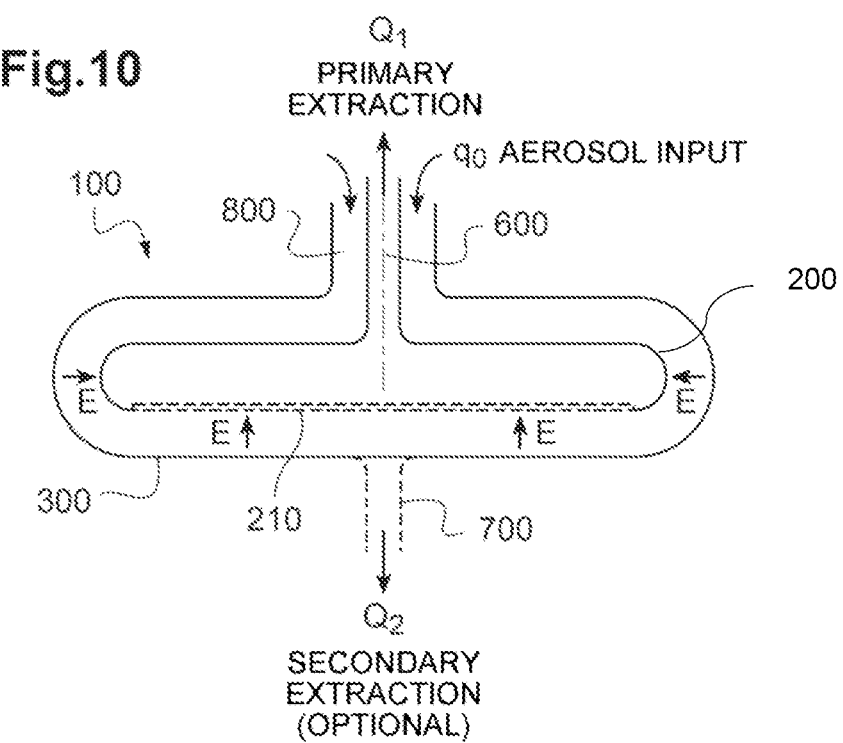

FIG. 10 shows a variant of device 100, which makes it possible to increase the separation of the fibers through the electrical force and the separation of the non-fibrous large particles through the field of gravity.

In this variant, the flat surfaces between which the electrical field is established are composed of the bottom face 210, of the disk 200, and of the top face of a disk 300 arranged coaxially horizontal one inside the other defining a space of constant thickness between them.

Each of these two disks 200, 300 is openwork and has concave circular edge.

The bottom face 210 of the bottom disk 200 is at least partly a filtering membrane.

The aerosol of charged particles is, here, introduced through a duct 800 produced in the axial extension of the outer disk 300 on the top of the latter then circulates in the space between disks 200, 300.

The separated fibers are collected on the membrane 210, the air transporting them being discharged through an output duct 600 produced in the axial extension above the filtering membrane 210. The output duct 600 can be coaxial to the input duct 800.

Optionally, the non-fibrous particles that fall through gravity can be discharged by the air in an output duct 700 produced in the axial extension of the outer disk 300 below the latter.

Figures 11, 11A:
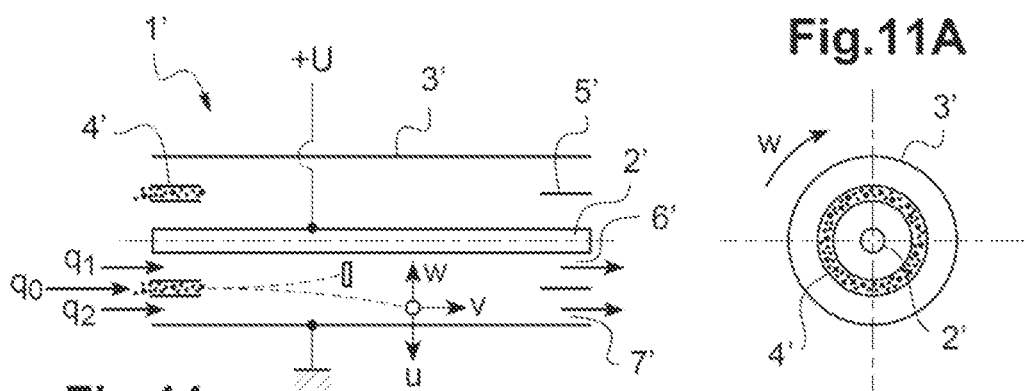
FIG. 11B is a schematic view in perspective and in partial longitudinal cross section of the device according to FIG. 11.
Figure 11B:
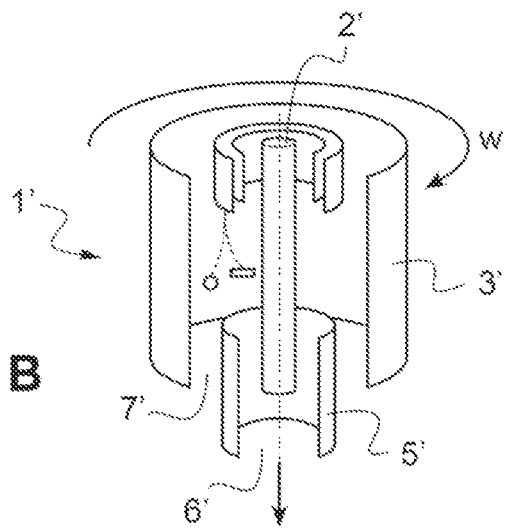

FIGS. 11, 11A and 11B show a device 1' according to the invention which implements the combined action of electrical and centrifugal forces for the separation of the fibers.

More specifically, the device 1' comprises, first of all, two electrically conductive coaxial cylinders 2', 3'.

These cylinders 2', 3' are preferably arranged vertically. Such an arrangement makes it possible not to add force of gravity which could disturb the centrifugal force to which the particles are subjected.

A cylindrical slit 4' is arranged in the space between the cylinders 2',3'.

An output cylindrical tube 5' is arranged between the two cylinders 2', 3'.

A uniform electrical field E is generated, of constant intensity between the cylinders 2', 3', the field E being directed radially from outside to inside. To do this, for example, the outer cylinder 3' is brought to the zero potential, whereas the inner cylinder 2' is at the potential +U.

The cylinders 2', 3' and the cylindrical output tube 5' are rotated at a rotation velocity $\vec{\omega}$.

Simultaneously, a longitudinal flow of filtered air with non-turbulent flow is introduced from the side of the slit 4' and made to circulate in the space between cylinders 2',3'. The filtered air flow rate is separated into a flow rate q1 between the slit 4' and the inner cylinder 2' and a flow rate q2 between the slit 4' and the outer cylinder 3'.

The aerosol is then introduced through the slit 4', at a flow rate $q_0$.

The electrically charged fibers have a greater electrical mobility than the equivalent spherical particles, the electrical field E therefore tends to attract them toward the inner cylinder 2' since their velocity according to the component w is greater than that according to the component u.

Thus, the flow rate Q1 is fiber-enriched and non-fibrous particle-depleted.

On the other hand, the non-fibrous particles are more subject to the centrifugal force than the fibers and therefore tend to move away from the inner cylinder to approach the outer cylinder 3'.

For a fixed geometry and flow rate, an appropriate value of the field E and of the rotation velocity W, it is therefore possible to direct the fibers and the fine particles that are highly electrically mobile and not subject to the centrifugal force, into the internal part of the space between the cylinders 2', 3', and direct the non-fibrous particles into the outer part of this space, above all the large particles, that have little electrical mobility, and are subject to the centrifugal force.

The fibers separated and borne by the air flow at the flow rate Q1 can therefore be recovered in the channel 6' delimited by the interior of the output tube 5' and the inner cylinder 2'.

In parallel, the large, non-fibrous particles borne by the air flow at the flow rate Q2 can be recovered in the output channel 7' delimited by the outside of the output tube 5' and the outer cylinder 3'.

The sum of the input flow rates $q_0$, $q_1$ and $q_2$ equals the sum of the output flow rates $Q_1$ and $Q_2$.

FIG. 12 shows a variant of device 100', which makes it possible to increase the separation of the fibers by the electrical force and the separation of the non-fibrous large particles by the centrifugal force and jointly with the force of gravity.

In this variant, the flat surfaces between which the electrical field is established are composed of the bottom faces 210', 310' of two disks 200', 300' arranged coaxially horizontal in one another defining a space of constant section between them.

Each of these two disks 200', 300' has a concave circular edge and the outer disk 300' is openwork.

The bottom faces 210', 310' of the disks 200, 300 are solid.

An output tube 500' is produced in the axial extension of the bottom face 310' of the outer disk 300'. This output tube 500' is composed of a first portion 510' separating the space between disks into two, prolonged by a cylindrical portion 520' along the axis of revolution of the disks.

The aerosol of charged particles is, here, introduced through a duct 800' produced in the axial extension of the outer disk 300' above the latter then circulates in the space between disks 200', 300'.

The disks 200', 300' and the output cylindrical tube 500' are rotated at a rotation velocity W.

The separated fibers are recovered with the air transporting them in the output duct 600' delimited by the inside of the tube 500'.

The non-fibrous particles subject to the forces, both centrifugal and of gravity, are discharged by the air into the output duct 700' produced around the tube 500'.

FIG. 13 shows a variant of the device 100' of FIG. 12: here, an input tube 900' makes it possible to add a filtered air flow rate $q_1$. The introduction of this filtered air $q_1$ makes it possible to increase the selectivity. Furthermore, that also makes it possible to reduce the thickness of the aerosol injection slit 400', and also reduce the thickness of the collection slit 600'.

FIG. 14 corresponds to FIG. 13 but with a configuration of the elements between which the field is established in the form of concentric spheres 200', 300'. The advantage of this variant according to FIG. 14 is that it makes it possible to have a constant electrical field.

FIG. 15 is a variant centrifugal device, in which a filtered air flow rate is also introduced into the duct 900'. According to this variant, the elements 200', 300' have a cylindrical geometry, which has the advantage of defining a zone of separation of the fibers by centrifugal force which is more extensive.

Other variants and enhancements can be made without in any way departing from the scope of the invention.

Thus, if, in the embodiments illustrated, the flow rate Q1 is shown equal to that of Q2 equal to the total flow rate divided by two Q/2, it is perfectly possible to envisage having Q1 different from Q2 and from Q/2.

The same goes for $q_0$,$q_1$ and $q_2$ which can be different from one another and also different from q/3.

Moreover, if, in all the examples illustrated, the flat surfaces of revolution are arranged coaxially one inside the other and define a space of constant thickness, it is perfectly possible to envisage implementing the invention with surfaces of revolution that are not parallel/coaxial and therefore with a space of variable thickness.

The invention is not limited to the examples which have just been described; it is notably possible to combine with one another features of the examples illustrated within variants that are not illustrated.

REFERENCES CITED

[1]: W. Hinds, "Aerosol Technology", 2nd *Edition,* 1999.

[2]: Zebel G., Hochrainer D., Boose C., "*A sampling method with separated deposition of fibres and other particles*", J. Aerosol Sci., 8:205-213 (1977).

[3]: Chen B. T., Yeh H. C., Hobbs C. H., "*Size Classification of Carbon Fiber Aerosols*", Aerosol Sci. Technol., 19:109-120 (1993).

[4]: Chen B. T., Yeh H. C., Johnson N. F., "*Design and use of a virtual impactor and an electrical classifier for generation of test fiber aerosols with narrow size distributions*", J. Aerosol Sci., 27(1):83-94 (1996).

[5]: Han R. J., Moss O. R., Wong B. A., "*Airborne Fiber Separation by Electrophoresis and Dielectrophoresis: Theory and Design Considerations*", Aerosol Sci. Technol., 21:241-258 (1994).

[6]: Griffiths W. D., "*The selective separation of aerosol particles of different shapes*", J. Aerosol Sci., 18(6):761-763 (1987).

[7]: Griffiths W. D., "*The shape selective sampling of fibrous aerosols*", J. Aerosol Sci., 19(6):703-713 (1988).

[8]: Baron P. A., Deye G. J., Fernback J., "*Length separation of fibers*", Aerosol Sci. Technol., 21:179-192 (1994).

[9]: Lilienfeld, P. "*Rotational Electrodynamics of Airborne Fibers*", J. Aerosol Sci. 4: 315-322 (1985).

[10]:Deye G. J., Gao P., Baron P. A., Fernback J., "*Performance Evaluation of a Fiber Length Classifier", Aerosol Sci. Technol.,* 30:420-437 (1999).

[11]: Dubey P., Ghia U., Turkevich L. A., "*Numerical investigation of sheath and aerosol flows in the flow combination section of a Baron fiber classifier", Aerosol Sci. Technol.,* 48:896-905 (2014).

[12]: Ehara, K., Hagwood, C., Coakley, K. J., "*Novel method to Classify Aerosol Particles According to Their Mass-to-Charge Ratio*", Aerosol Particle Mass Analyzer, J. Aerosol Sci, 27:217-234 (1996).

[13]: Olfert, J. S., Collings, N. "*New Method for Particle Mass Classification: the Couette Centrifugal Particle Mass Analyser*", J. Aerosol Sci, 36:1338-1352 (2005).

The invention claimed is:

1. A method for sorting micro- and nano-fibers in suspension in an aerosol containing fibers of different sizes and non-fibrous particles, comprising the following steps:

a/charging of the fibers and particles in suspension in the aerosol, by unipolar ion diffusion;

b/application of an electrical field between two electrically conductive surfaces of revolution, each being arranged with with a vertical axis and defining a space between the two surfaces or revolution; the electrical field being directed from an outer surface to an inner surface;

c/introduction of an aerosol flow from an input on top between the two surfaces of revolution; a flow of air being non-turbulent in the space between the two surfaces of revolution; the air flow circulating from the input on top between the two surfaces of revolution to an output below, delimited by an output tube arranged between the two surfaces of revolution;

c'/simultaneously with the step c/, rotation at a given velocity of the two surfaces of revolution and of the output tube; and d/recovery of a part of air flow charged with fibers and circulating inside the output tube; the fibers recovered in the part of air flow being separated from the non-fibrous particles initially present in the aerosol and ejected by centrifugal force out of the output tube.

2. The sorting method according to claim 1, further comprising a step d'/simultaneous with the step d/, whereby a part of air flow charged with non-fibrous particles and circulating inside the output tube is recovered.

3. The sorting method according to claim 2, wherein the two surfaces of revolution and the output tube are cylinders, whereby:

the step c/is performed by introduction of the aerosol into an input slit arranged in the space between cylinders and by circulation of an axial flow of filtered air introduced on either side of the slit co-current with the aerosol flow; and the step d/is performed by recovery of the part of the air flow charged with fibers inside the output tube.

4. The sorting method according to claim 2, wherein the two surfaces of revolution are openwork discs with concave circular edge, arranged horizontally, defining the space between them; the input being a duct produced in an axial extension of an outer disc on top thereof; the output tube being composed of a first portion separating the space between discs into two, prolonged by a cylindrical portion along an axis of revolution; a method whereby:

the step c/is performed by introduction of the aerosol into the input duct; and the step d/is performed by recovery of the part of air flow charged with fibers inside the output tube.

5. The sorting method according to claim 1, further comprising detection and measurement of concentration in terms of number of fibers in air.

6. The sorting method according to claim 1, further comprising a step d'/simultaneous with the step d/, whereby a part of air flow charged with non-fibrous particles and circulating inside the output tube is recovered separately from the part of air flow charged with fibers.

7. The sorting method according to claim 1, wherein the two surfaces of revolution and the output tube are cylinders, whereby:

the step c/is performed by introduction of the aerosol into an input slit arranged in the space between cylinders and by circulation of an axial flow of filtered air introduced on either side of the slit co-current with the aerosol flow; and the step d/is performed by recovery of the part of the air flow charged with fibers inside the output tube.

8. The sorting method according to claim 1, wherein the two surfaces of revolution are openwork discs with concave circular edge, arranged horizontally, defining the space between them; the input being a duct produced in an axial extension of an outer disc on top thereof; the output tube being composed of a first portion separating the space between discs into two, prolonged by a cylindrical portion along an axis of revolution; a method whereby:

the step c/is performed by introduction of the aerosol into the input duct; and the step d/is performed by recovery of the part of air flow charged with fibers inside the output tube.

9. A sorting device, comprising:

two electrically conductive surfaces of revolution, each having a vertical axis and defining a space between the two surfaces;

means for applying an electrical field between the two surfaces, the field being directed from an outer surface to an inner surface;

means for introducing an aerosol flow of fibers in suspension in an aerosol likely to contain non-fibrous particles, from an input on top between the two surfaces of revolution;

means for rotating at a given velocity the two surfaces of revolution and an output tube arranged coaxially below between the two surfaces of revolution; and means for recovering a part of an air flow charged with fibers, inside the output tube.

10. The device according to claim 9, further comprising means for recovering the part of the air flow charged with non-fibrous particles inside the output tube.

11. The device according to claim 10, further comprising means for recovering the part of the air flow charged with non-fibrous particles inside the output tube, separately from the part of air flow charged with fibers.

12. The device according to claim 9, wherein the two surfaces of revolution are coaxial cylinders, the input being a slit arranged in the space between cylinders, the output tube being a cylinder.

13. The device according to claim 9, wherein the two surfaces of revolution are two disks with concave circular edge, arranged horizontally coaxially to one another defining the space between them; the input being a duct produced in an axial extension of an outer disk on top thereof; the output tube being composed of a first portion separating the space between disks into two, prolonged by a cylindrical portion along an axis of revolution.

14. The device according to claim 13, further comprising means for detection and measurement of concentrations of short asbestos fibers (SAF) and/or of fine asbestos fibers (FAF).

* * * * *